(12) United States Patent
Wells (10) Patent No.: US 9,424,202 B2
(45) Date of Patent: Aug. 23, 2016

(54) DATABASE SEARCH FACILITY

(71) Applicant: Smartfocus Holdings Limited, London (GB)

(72) Inventor: Charles Wells, London (GB)

(73) Assignee: Smartfocus Holdings Limited (GB)

( * ) Notice: Subject to any disclaimer, the term of this patent is extended or adjusted under 35 U.S.C. 154(b) by 467 days.

(21) Appl. No.: 13/681,247

(22) Filed: Nov. 19, 2012

(65) Prior Publication Data

US 2014/0143501 A1    May 22, 2014

(51) Int. Cl.
*G06F 13/00*   (2006.01)
*G06F 12/12*   (2016.01)
*G06F 12/08*   (2016.01)
*G06F 17/30*   (2006.01)

(52) U.S. Cl.
CPC .............. *G06F 12/122* (2013.01); *G06F 12/08* (2013.01); *G06F 12/0871* (2013.01); *G06F 12/0873* (2013.01); *G06F 12/0888* (2013.01); *G06F 12/12* (2013.01); *G06F 12/121* (2013.01); *G06F 12/123* (2013.01); *G06F 17/3048* (2013.01)

(58) Field of Classification Search
None
See application file for complete search history.

(56) References Cited

U.S. PATENT DOCUMENTS

| 5,787,471 | A | 7/1998 | Inoue et al. |
| 5,924,116 | A | 7/1999 | Aggarwal et al. |
| 6,973,536 | B1 | 12/2005 | Jacobs et al. |
| 7,177,984 | B1 | 2/2007 | Hervas |
| 2012/0054447 | A1* | 3/2012 | Swart et al. .................. 711/136 |

OTHER PUBLICATIONS

International Search Report and Written Opinion for PCT/GB2013/053042, dated Feb. 17, 2014.

* cited by examiner

*Primary Examiner* — Midys Rojas
(74) *Attorney, Agent, or Firm* — Rajesh Vallabh; Foley Hoag LLP (57) ABSTRACT

A database cache manager for controlling a composition of a plurality of cache entries in a data cache is described. Each cache entry is a result of a query carried out on a database of data records, the cache manager being arranged to remove cache entries from the cache based on a cost of removal factor which is comprised of a time cost, the time cost being calculated from the amount of time taken to obtain a query result to which that cache entry is related.

24 Claims, 6 Drawing Sheets

DATABASE SEARCH FACILITY

FIELD OF THE INVENTION

This invention relates to an improved database search facility and to an improved database cache manager for managing a data cache. More particularly, though not exclusively, the present invention relates to a system for providing a faster response to search queries for very large databases.

BACKGROUND TO THE INVENTION

There are many situations in which someone may wish to query a large database containing over one hundred million rows of data in order to extract information based on a number of search criteria. For example, people working in marketing will often work with large databases containing details of all potential customers who they may wish to target with a new offer. In order to tailor the offer to meet the requirements of their target audience, they need to retrieve information from the database for all people who fit into a particular profile. For instance, a typical database search query might be to find all clients aged under 20, who are married and who are earning over £40000 per year. This will then identify all of the appropriate people to the marketer, who can then analyse additional data relating specifically to that group of people in order to tailor their offer.

Given that people such as marketers perform frequent database queries of this nature, it is important that results are obtained quickly. Typically, query responses within one second are required. However, a large database may contain over a billion rows of data, therefore searching the database may be time consuming. There are a number of options available for improving the speed of a query response. Firstly, the user can purchase very fast hardware, to reduce the access times for read operations which is the main contributor to the response time. Such hardware may reside in equipment optimised for faster hard disk read/write operations. However, this option is very expensive, has a limit to the reduction of time which can be achieved, and is ultimately limited to the capability of hardware that is available. A second option is to implement a system which calculates in advance the results of all possible search queries, such that when the user later enters a search query, the result can be obtained from a look-up table. However, this option is complex and inflexible, in that it does not allow for the data within the database to be updated. A further option is to use a column database which has been optimised for data retrieval. In known arrangements which use this option, the use of a cache memory not requiring a disk access to store the results of previous searches is used to improve searching efficiency. Alternatively, where the cache is provided on disk, the time taken to conduct a query against the data of the large database can be reduced by providing the cache on disk. These results can be retrieved quickly from the cache if the user repeats the search at a later stage, thus bypassing the process of querying the database again, which may also include the time costly disk access.

The use of caching is well-known in the art, and a cache memory is employed in a number of applications in the field of computer science. For example, the central processing unit (CPU) of a computer has a block of cache memory, typically RAM, which is used to store information that is likely to be required again in the near future. Similarly, computer hard disks incorporate cache memory for speeding up common data retrieval, as do web-browsers and web-servers.

A cache memory has a finite size; if it did not, it would continue to grow indefinitely, and would eventually become larger than the database with which it is associated. If the cache memory becomes very large, it can be more time consuming to retrieve data from it, and it can also present problems of resource consumption to the system which has limited resources. The size of the cache memory is optimised so as to strike a balance between having enough capacity to store a useful number of results, and being small enough to be searched quickly and not consuming too much of the available resources. Clearly, then, after a while the cache memory will become full, thus preventing any new search results from being added. A common approach to managing this is to simply remove results that haven't been used recently. However, this does not take into account how useful those search results are, and therefore the cache can often lose search query results that are more useful than the new ones which replace them. This means that the set of query results that are retained by in the cache memory is not optimal.

It is desired to overcome or substantially reduce at least some of the above described problems with database searching systems which currently form the state of the art.

SUMMARY OF THE INVENTION

It is one object of the present invention to provide a caching method for a column database which overcomes the problems associated with the caching systems which currently form the state of the art. To this end, according to a first aspect of the invention, there is provided a database cache manager for controlling a composition of a plurality of cache entries in a data cache, each cache entry being a result of a query carried out on a database of data records, the cache manager being arranged to remove cache entries from the cache based on a cost of removal factor which is comprised of a time cost, the time cost being calculated from the amount of time taken to obtain a query result to which that cache entry is related.

The database cache manager may further be arranged to calculate the time cost.

Preferably the cost of removal factor is comprised of a frequency cost which is calculated from the frequency with which the cache entry has been used in the past. The database cache manager may in this case be further arranged to calculate the frequency cost.

Preferably, the cost of removal factor is comprised of a recency cost which is calculated from an elapsed time since the cache entry was last used. In this case, the database cache manager may be further arranged to calculate the frequency cost.

In an exemplary embodiment, the cost of removal factor is comprised of a frequency cost which is calculated from the frequency with which the cache entry has been used in the past and a recency cost which is calculated from an elapsed time since the cache entry was last used. In this case the database cache manager may be further arranged to calculate the time cost, the frequency cost and the recency cost. It has been found that a particularly optimal cost removal factor equals (0.3×recency cost)+(0.3×frequency cost)+(0.4×time cost).

The database cache manager may be further arranged to store the cost of removal factor with each cache entry in the data cache.

Preferably, the cache manager is arranged to create and store a definition file with each cache entry, the definition file describing the cache entry and assisting in the searching of that cache entry.

The cache manager may be arranged to assign a key to each cache entry, wherein the key is a unique identifier of the entry and comprises information which contributes to the query result with which the cache entry is associated. Preferably in this case, the database cache manager further comprises a hashing module arranged to create hash keys of the keys stored in the cache entries, which enables efficient searching of data stored in the cache by the cache manager.

The hashing module may be arranged to create hash keys and to populate a hash map with the created hash keys. In this case the cache manager may be arranged to use the hash keys to search the cache for the results to a query.

Preferably, at least one of the cache entries stored in the cache comprises a result of an individual query segment.

In this case, the database cache manager may be arranged to combine different stored cache entries representing individual query segments to return a complete multi-segment query result.

Also at least one of the cache entries stored in the cache may comprise a result of a complete multi-segment query.

Preferably, the database cache manager further comprises a class module for referencing a class of cache results, wherein manipulation of the class enables management of all cache entries belonging to that class.

The cache manager may be arranged to store properties and methods relating to manipulation of the cache entry with the cache entry itself. More particularly, the cache manager may be arranged to store the size of the cache entry, the time taken to create the cache entry and methods of manipulation applicable to the cache entry.

According to another aspect of the present invention there is provided a method of controlling a composition of a plurality of cache entries in a data cache, each cache entry being a result of a query carried out on a database of data records, the method comprising: calculating a time cost from the amount of time taken to obtain a query result to which a corresponding cache entry is related; and removing a cache entry from the data cache based on a cost of removal factor which is comprised of the time cost.

According to another aspect of the present invention there is provided a database system comprising: a database of a first plurality of data records; a data cache storing a second plurality of cache entries less than the first plurality, each entry being a result of a query carried out on the database and which can be accessed more quickly than by querying the database; a cache manager for controlling a composition of the second plurality of cache entries, the cache manager being arranged to remove cache entries from the cache based on a cost of removal factor which is comprised of a time cost, the time cost being calculated from the amount of time taken to obtain the query result that the cache entry relates to.

BRIEF DESCRIPTION OF THE DRAWINGS

In order that the invention may be more readily understood, preferred non-limiting embodiments thereof will now be described with reference to the accompanying drawings, in which like objects have been assigned like reference numerals, and in which.

DETAILED DESCRIPTION OF EMBODIMENTS
OF THE INVENTION

Figure 1:
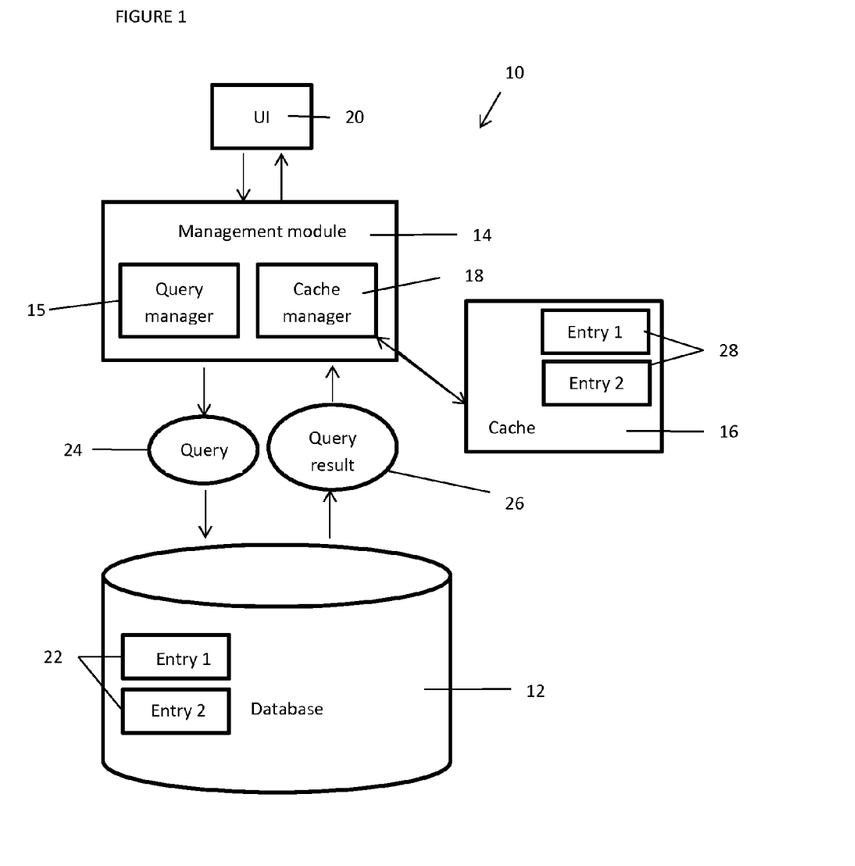
FIG. 1 is a schematic drawing of the overall architecture of a database system, where the database system includes a cache according to the present embodiment.

FIG. 1 shows the overall architecture of a database system 10 according to an embodiment of the invention, including a database 12, a management module 14, a query manager 15, a cache 16, a cache manager 18 and a user interface (UI) 20. All of these elements are provided within a computer system which runs the database system. The database 12 is a collection of data which can relate to any field. For example, the data may relate to people, to be used for marketing purposes. In this example, details relating to a person, such as their age, gender and marital status, are stored in the database 12 as a database entry 22. The database 12 is a large database having at least a hundred million rows of data and typically billions of rows of data. The database system 10 comprises one or more hard disks for storing the large database 12.

The UI 20 is a program that allows the user to interact with the database 12, by sending a query 24 and returning a query result 26 from the management module. The management module 14 is a program which manages the database 12, including the inputting and removal of database entries 22 from the database 12, as well as handling queries 24 and responses from the UI 20.

The cache 16 includes a block of memory such as RAM which in this embodiment is used to store data which has been retrieved from the database 12, which is likely to be used again, along with processes which are used to maintain and update the data which is stored in the block of memory. The cache 16 is much smaller than the database 12 and uses integrated circuits rather than a data disk to store data. Accordingly, it is much faster in this embodiment to retrieve query results 26 from the cache 16 than from the database 12. In an alternative embodiment, the cache 16 can be provided on the disk where the database 12 is provided. Whilst this alternative arrangement suffers from slower query response times than use of cache 16 in RAM, it does have the advantage of being less restricted in size. Other embodiments can provide a combination of a cache 16 having a part in RAM and a part on the disk.

In other embodiments where the database 12 is also stored in a large memory comprising integrated circuits, which is very expensive, the speed of data retrieval is still much faster from the cache 16 than from the database 12 due to the relative differences in size. Therefore, retrieving data from the cache 16 rather than from the database 12 on the next occasion the data is required saves time and speeds up the querying process. The cache 16 may be separate from the database 12 as in the present embodiment, or may be an allocated block of memory which is contained within the database 12 in another embodiment (not shown). Retrieved data is added to the cache 16 as a cache entry 28, such that the cache 16 contains a set of cache entries 28.

In addition to previously retrieved data, the cache 16 may also contain statistical computations relating to the data within the database 12, for example the mean or median of a data-set. These statistical computations can extend across multiple dimensions, taking into account multiple properties relating to the database entries 22, and in this respect the computations are known in the art as cube results.

Figure 2:
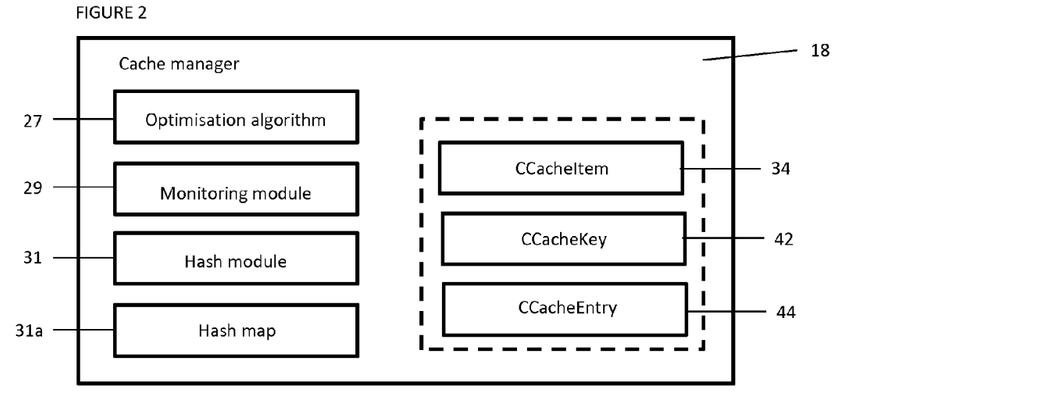
FIG. 2 is a schematic drawing of the cache manager in FIG. 1.

Referring now to FIG. 2 in combination with FIG. 1, the cache manager 18 is an object (module) running in the management module 14 that manages the cache 16, and comprises optimisation algorithms 27, a monitoring module 29, a hashing module 31 and an associated hash map 31*a*. The cache manager 18 further includes three class modules: CCacheItem 34, CCacheKey 42, and CCacheEntry 44. The optimisation algorithms 27 ensure the cache 16 contains the most useful data possible at all times. The monitoring module 29 is arranged to determine when the database 12 has been updated, and the hashing module 31 is arranged to create and populate the hash map 31*a* with hash keys (not shown) which allow for efficient searching of data stored in the cache, which is described in more detail later.

The cache manager 18 handles: the creation of cache entries 28; adding cache entries 28 to the cache 16; and retrieving cache entries 28 from the cache 16. The class modules 34, 42, 44 contain information and methods which allow the cache manager 18 to perform these actions.

Figure 3:
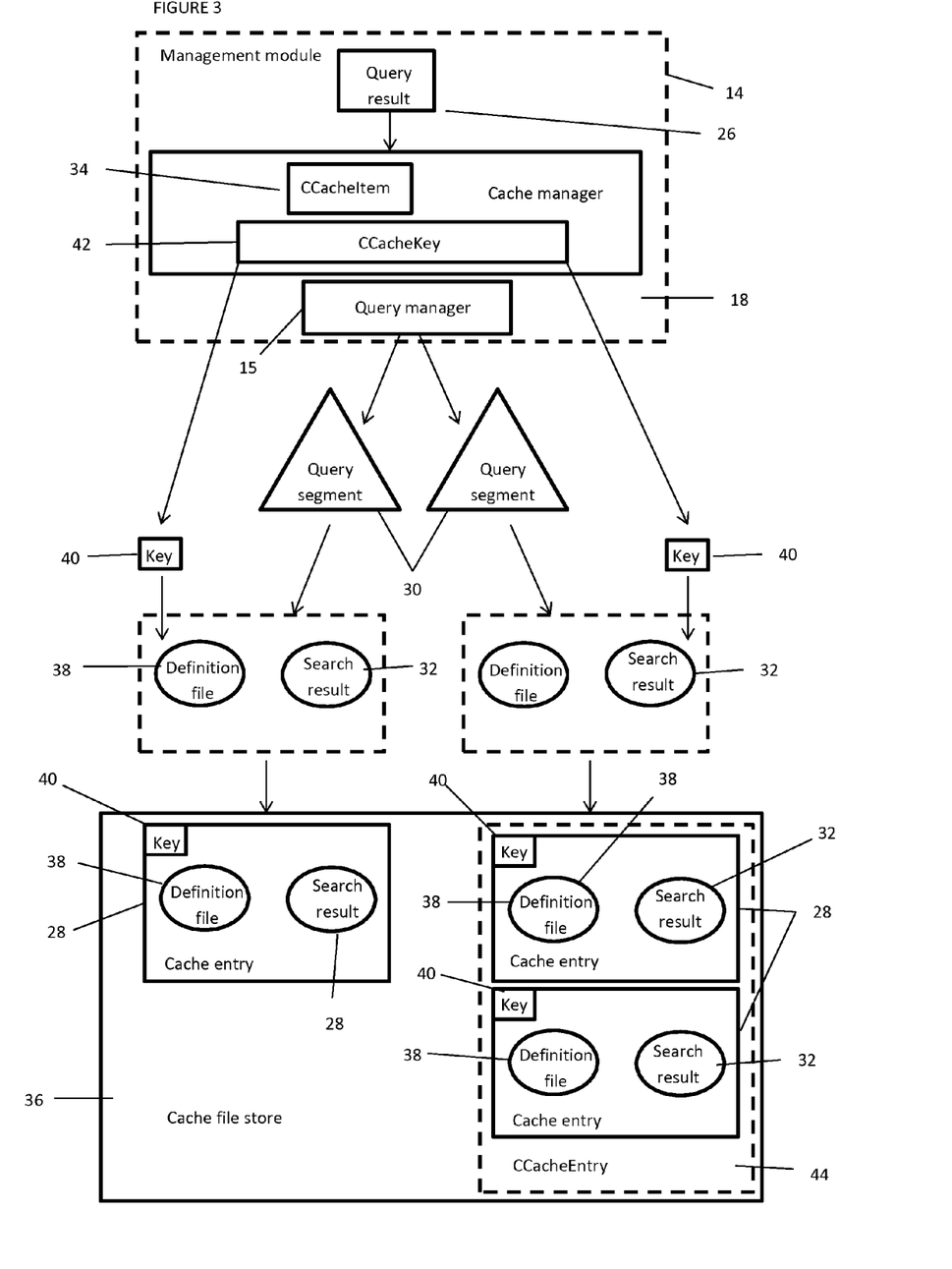
FIG. 3 is a flow diagram showing the components of the system of FIGS. 1 and 2 which are involved in the process for adding a query result to the cache through the cache manager.

Referring now to FIG. 3, a method of updating the cache 16 is shown. In order to update the cache 16, a search query 24 first needs to be sent to the database 12 and a query result 26 obtained. When a user submits a query 24 including one or more search criteria to the database 12, this is sent through the UI 20 via the management module 14. The search criteria define one or more query nodes or query segments 30; one query segment 30 corresponding to each search criterion. The query manager 15 divides the query 24 into query segments 30 based on the search criteria, so that the management module 14 can then check each database entry 22 within the database 12 against the search criteria. If the database entry 22 matches the search criteria, this is added to a list of matching database entries 22 which forms the query result 26. Each query segment 30 is searched separately, such that an individual search result 32 is produced which corresponds to each query segment 30. The individual search results 32 are combined to obtain the query result 26, which represents the database entries 22 that fit all of the search criteria. The management module 14 then returns this query result 26 through the UI 20 to the user, so that they are able to conduct further processing on the database entries 22 which have been identified.

When a query result 26 has been obtained by the management module 14, this is passed to the cache manager 18 as shown in FIG. 3. Each query result 26 may be submitted to the cache manager 18 by the management module 14 using the CCacheItem 34 class module, which is an abstract base class for all objects that need to be submitted to the cache 16 which contains properties and methods relating to the object. CCacheItem is a base class, so any classes that inherit from it will automatically get all its properties and methods. These properties and methods include how much space is consumed by the object, how long it took to create, and methods for moving the object between memory locations, the cache item may be in memory or may be on disk. The methods define how to move the object between the two formats (e.g. to disk from memory) and is particularly useful when the cache 16 has a portion in RAM and a portion on disk.

In one embodiment of the invention, the cache manager 18 then uses the CCacheItem 34 to store the query result 26 as a cache entry 28, in a cache file store 36, which is the block of memory or an area of the hard disk assigned to the cache 16. To do this, the cache manager 18 uses an 'add' method of the CCacheItem 34 of a type that is known in the art. Each cache entry 28 has two corresponding files in the cache file store 36: one is a definition file 38 which is created by the CCacheItem 34 and provides the definition of the cache entry 28, in this case the query segments 30 contained within the query 24; and the other is the query result 26. The definition file 38 further includes information relating to the cache entry 28 which may be used in the optimisation algorithm 27 which manages the cache 16, such as the size of the cache entry 28, as will be described later.

As mentioned previously, the query manager 15 divides the query 24 up into query segments 30, with each query segment 30 representing a search criterion contained within the query 24. The query segments 30 are then also stored in the cache 16, along with the respective search result 32 for that query segment 30. In the illustration in FIG. 3, the query 24 is divided into two query segments 30 which correspond to two search criteria, although there is no limit on how many query segments 30 a query 24 may be divided into. There is also a cache entry 28 for the query 24 as a whole. Therefore, if, for example, a query result 26 relates to a query 24 having two query segments 30, this query result 26 will be added to the cache file store 36 as three cache entries 28; one for each query segment 30 and corresponding search result 32, and a third for the query result 26 relating to the query 24 as a whole. Those three cache entries 28 would be made up of six files in total (three definition files 38 and three search results 32).

In another embodiment, the query result 26 for the overall query 24 is not stored; only search results 32 for individual query segments 30 are stored in the cache 16.

The advantage of storing individual query segments 30 is that they are more likely to be used again subsequently than the query 24 as a whole, and therefore provide greater benefit. Individual query segments 30 can be combined with other query segments 30 which are stored in the cache 16 in order to produce a new query result 26, without the need to query the database 12 directly, therefore saving time.

Each cache entry 28 is assigned a cache key 40 when it is added to the cache 16. The cache key 40 may be added to the definition file 38, and is a unique identifier in extensible markup language (XML) string format which enables the cache manager 18 to locate the cache entry 28 quickly when conducting future searches. The XML string that constitutes the cache key 40 contains all the details that contribute to the query result 26 with which the cache entry 28 is associated. This enables to cache manager 18 to identify the correct cache key 40 when requesting results from the cache 16. The task of creating a cache key 40 for each cache entry 28 may be carried out by the CCacheKey 42 class module. The process of creating a cache key 40 is repeatable, such that a particular query 24 will produce the same cache key 40 every time; this enables the cache manager 18 to find the correct cache key 40 at a later stage.

In order to further improve the performance of querying the cache 16, a hash key value is generated from each cache key 40. A hash key (not shown) is generated by the hash module 31 using a hash function, which is an algorithm which is known in the art, which maps a large data set of variable length, in this case the cache key 40, into a smaller data set of fixed length. The cache manager 18 is arranged in this embodiment to store the hash keys in the hash map 31a, which is a known data structure that enables very rapid searching of the hash keys.

The CCacheEntry 44 class module may be used to manage a collection of cache entries 28. Each CCacheEntry 44 class module may be arranged to maintain a set of field and table dependencies for each cache entry 28 which is assigned to the CCacheEntry 44 class module, thereby enabling the cache manager 18 to remove those cache entries 28 when the table or fields are updated. The cache manager 18 uses the monitoring module 29 to detect when a field of table has been updated.

Figure 4:
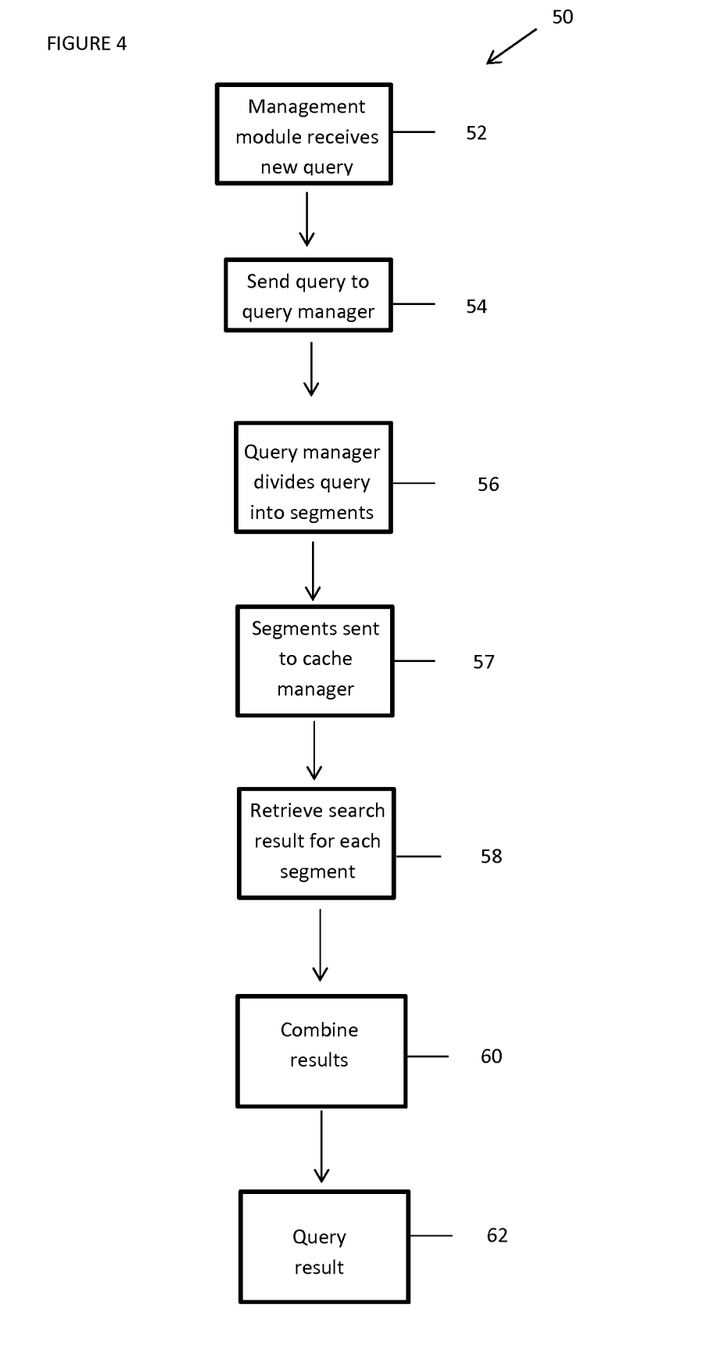
FIG. 4 is a flow diagram showing the process for obtaining a query result for a new query, where the process includes retrieving a cached query result which was added to the cache previously according to the process shown in FIG. 3.
Figure 5:
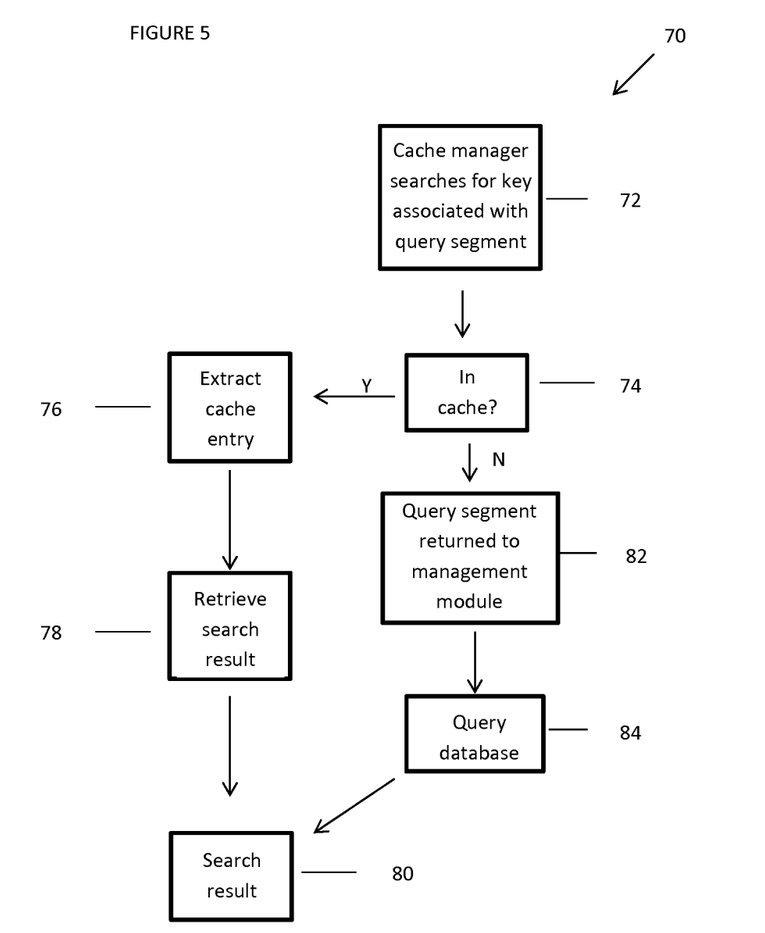
FIG. 5 is a flow diagram showing a subroutine of the process in FIG. 4 for the retrieval stage of the process.

FIGS. 4 and 5 show the process 50 the database system 10 undergoes according to one embodiment of the invention to retrieve a result when a new query 24 is entered by a user. The management module 14 receives at Step 52 the new query 24 from the UI 20, and is arranged to check whether results for part of or the entire query 24 are contained within the cache 16. To this end, the management module 14 sends at Step 54 the query 24 on to the query manager 15. The query manager 15 then divides at Step 56 the query 24 up into query segments 30, in the same way that the cache manager 18 does when adding new cache entries 28 to the cache 16.

Once this has been done, the query manager 15 sends at Step 57 the query segments to the cache manager 18, which retrieves at Step 58 the search result 32 for each query segment 30 from the cache file store 36, using the retrieval process 70 illustrated and described later in FIG. 5. Once a search result 32 for each query segment 30 has been obtained, either from the cache 16, or by querying the database 12, those search results 32 are combined at Step 60 to produce an overall query result 26. This query result 26 will then be returned at Step 62 to the user through the UI 20, and any search results 32 for query segments 30 that were obtained by querying the database 12 are stored in the cache 16 in the way described below, so that they are available for future searches.

At the start of the retrieval process 70, the cache manager 18 searches at Step 72 for a cache key 40 associated with the first query segment 30, using a find method. If the cache manager 18 locates at Step 74 a cache key 40, it extracts at Step 76 the associated cache entry 28, and from that cache entry 28 the file which relates to the search result 32 for that query segment 30 is obtained at Step 78. This search result 32 is then returned at Step 80 to the management module 14. If the cache manager 18 is unable to identify at Step 74 a cache key 40 for a particular query segment 30, it assumes that this query segment 30 has not been searched for previously and is therefore not contained within the cache 16. At this point, the cache manager 18 sends at Step 82 the query segment 30 back to the management module 14 so that the database 12 can be queried at Step 84 directly in order to obtain at Step 80 the search result 32 for this query segment 30. The cache manager 18 then moves on to the next query segment 30, and iterates (not shown) this process until the whole query 24 has been searched.

Over time, the size of the set of cache entries 28 will increase, as the database 12 continues to be queried and store the results in the cache 16. The cache 16 has a limited memory assigned to it, because otherwise it could continue to grow indefinitely and consume vast resources. A larger memory allocation will allow the cache 16 to store more query results 26, which increases the likelihood that the query result 26 for a new query 24 will be in the cache 16. However, the larger the cache 16 is, the more resources it will consume. A larger cache 16 may additionally be more difficult to search, and therefore query response times may suffer. The longer it takes to retrieve a result from the cache 16, the less likely it is that the cache 16 will save any significant amount of time compared with querying the database 12 directly. Therefore, the amount of memory allocated to the cache 16 is at a level that strikes a balance between these considerations. In the present embodiment, one quarter of the memory allocation provided for an Analytical Data Server (ADS—namely the management module 14 including the query manager 15 and the cache manager 18) is assigned to the integrated cache 16. The amount of memory assigned to the ADS 14 in this embodiment is determined by the operating system of the computer at the time the ADS 14 is being installed and run on the computer system. A typical size of the memory allocation for the ADS 14 is anything from 6 Gigabytes to 64 Gigabytes for example, thus giving an integrated cache 16 size of 1.5 Gigabytes to 16 Gigabytes respectively. This may be within a system having a total working integrated RAM memory size of say 1 Terabyte for example. The other parts of the RAM would be used for running other programs and also running the UI 20 for example.

A corresponding disk cache allocation of another embodiment is around eight times this amount, namely 12 Gigabytes to 128 Gigabytes for example. This size of disk cache would be provided within a total hard disk size of 1-2 TerraBytes of disk storage which would support the database 12, for example. As has been stated previously, other embodiments may include a combination of both integrated memory cache 16 and disk cache (not shown).

As the cache 16 is finite in size, the cache 16 will approach its capacity as more results are added with each new database query 24. When the cache 16 becomes full, the cache manager 18 needs to remove some of the cache entries 28 in order to create space for new ones. A common approach that is used in the art is to arrange for the cache manager 18 to remove the oldest cache entries 28 when making space for new ones. However, as mentioned previously, this does not take into account whether the old cache entries 28 were time-consuming results to obtain from the database 12 in the first place, or how often that particular cache entry 28 was used; with a limited amount of memory available to the cache 16, it is important that the set of cache entries 28 that is retained is optimised.

For this reason, the present embodiment incorporates the optimisation algorithm 27 by which the cache manager 18 calculates an associated cost of removal for each cache entry 28, and then removes cache entries 28 on that basis. There are three components which may contribute toward the cost of removal of a cache entry 28: a recency cost; a frequency cost; and a time cost. In one embodiment, each of these components is obtained from the definition files 38 contained within the cache entries 28.

The recency cost relates to how recently the cache entry 28 was last used. The cache manager 18 monitors the elapsed time since each cache entry 28 has been used. If a cache entry 28 hasn't been used in a long time, the probability that it will be used again is lower than for a cache entry 28 that has been used recently. Therefore, the lower the amount of time which has elapsed since a particular cache entry 28 was last used, the higher its associated recency cost is. In one embodiment, the time that has elapsed in seconds since a cache entry 28 has been used is used to define the recency cost according to the following equation:

recency cost=100/(1+elapsed time/600)

Therefore, if no time (in seconds) has elapsed since the cache entry 28 was last used, the equation gives a value of 100 for the recency cost. Alternatively, if ten minutes has elapsed since the equation was last used, the equation gives a value of 50 for the recency cost. As the elapsed time increases, the recency cost decreases down towards a minimum value of 0, although in practice it will never reach 0.

The frequency cost relates to how often a cache entry 28 has been used. The cache manager 18 monitors how often each cache entry 28 is used. If the cache entry 28 has not been used often, the probability that it will be used again is lower than for a cache entry 28 that has been used regularly. Therefore, the more often a particular cache entry 28 is used, the higher its associated frequency cost is. In one embodiment, the number of times that a cache entry 28 has been used is known as a usage count, and is used to define the frequency cost according to the following equation:

frequency cost=100−(100/(1+usage count/2))

Therefore, if the usage count is 0, indicating that the cache entry 28 has never been used, this equation gives a frequency cost of 0. As the usage count gets higher, the frequency cost increases, up towards a maximum value of 100, although in practice it will never reach 100.

The time cost relates to how long it took for the management module 14 to calculate the cache entry 28 in the first place. The cache manager 18 is provided with this information by the CCacheItem 34 class module when adding each cache entry 28 to the cache 16. The longer it took to calculate, the more benefit there is to retaining the cache entry 28 in the cache 16. Therefore, the higher the time taken to calculate a cache entry 28, the higher its associated time cost is. In one embodiment, the amount of time in milliseconds that it took to create a cache entry 28 is used to define the time cost according to the following equation:

time cost=100−100/(1+(time taken/5000))

Therefore, if a cache entry 28 took 0 milliseconds to create, this equation gives a time cost of 0. If the cache entry 28 took five seconds to create, the equation gives a value of 50 for the time cost. The time cost value increases as the time taken increases, up towards a maximum value of 100, although in practice it will never reach 100.

In one embodiment of the invention, the cost of removal for a cache entry 28 is calculated using all three of these components. In this case the following equation is used:

cost of removal=(0.3×recency cost)+(0.3×frequency cost)+(0.4×time cost)

This equation provides a value for the cost of removal of a cache entry 28 that lies in the range 0 to 100. The equation is slightly weighted towards the time cost, as this may be considered the most important component when optimising the cache 16.

In another embodiment, the cost of removal is calculated from a combination of any two of the above mentioned components.

Once the optimisation algorithm 27 has assigned a cost of removal to each cache entry 28, they are then sorted according to this cost of removal. The optimisation algorithm (27) then determines the best combination of cache entries 28 to delete in order to bring the cache 16 within its fixed memory limit. As cache entries 28 do not all take up the same amount of memory, it will not always be the case that the cache entries 28 that are deleted are those ranked lowest according to cost of removal; for example, it may be that the cache entry 28 with the third lowest cost of removal takes up more memory than the two lower ranked cache entries 28 put together, and deleting only this cache entry 28 will bring the cache 16 back within its memory limit. Therefore, in this example the best solution is to remove the cache entry 28 with the third lowest cost of removal, as the overall cost of removal for this one cache entry 28 is lower than the overall cost of removal for both of the lower ranked cache entries 28. Therefore, another determining factor for the optimisation algorithm 27 is retaining as many cache entries 28 as possible in the cache 16.

Figure 6:
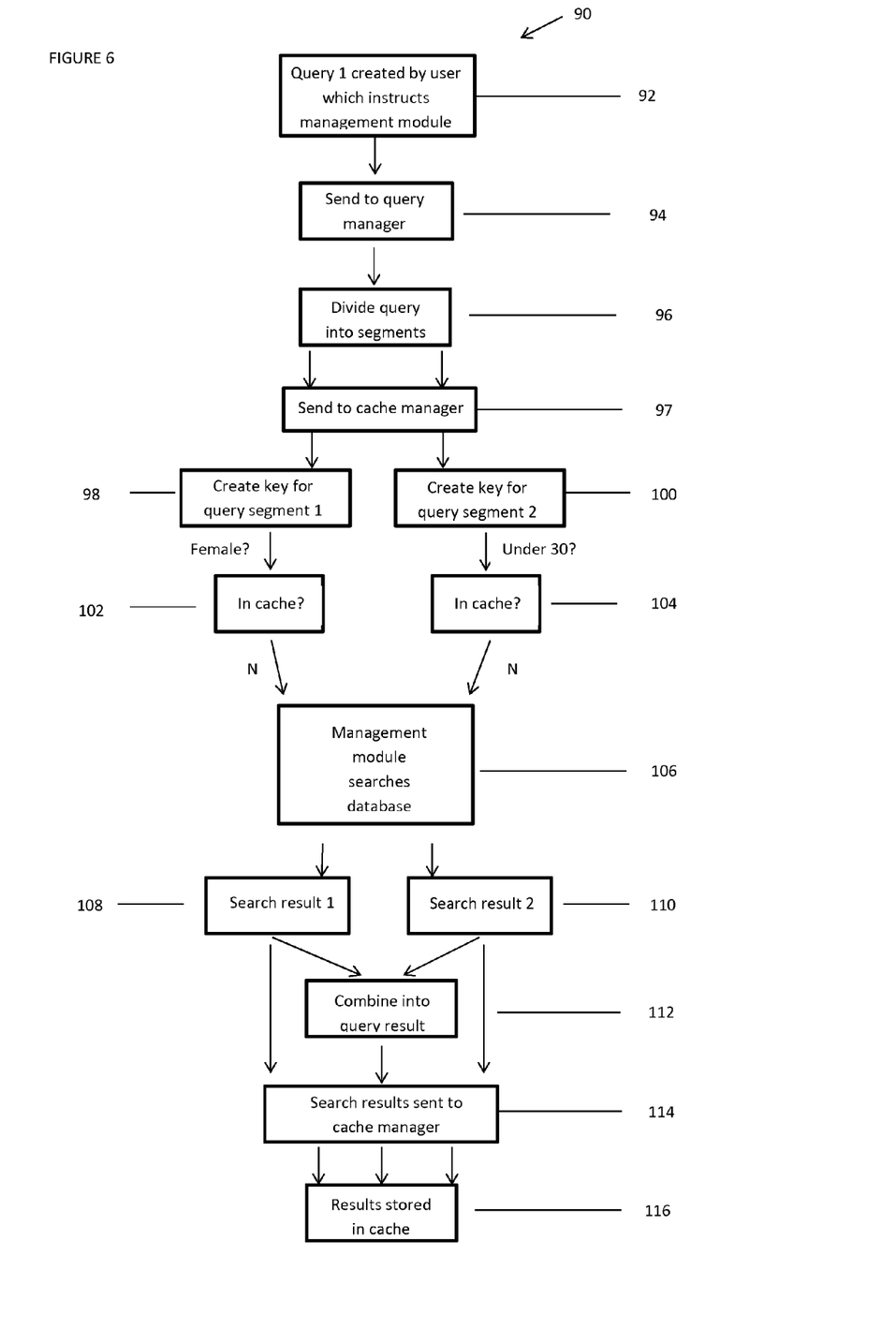
FIG. 6 is a flow diagram showing a first stage of a worked example of a typical query being stored in the cache of FIG. 1 and then subsequently the cached result is used as part of a new query.
Figure 7:
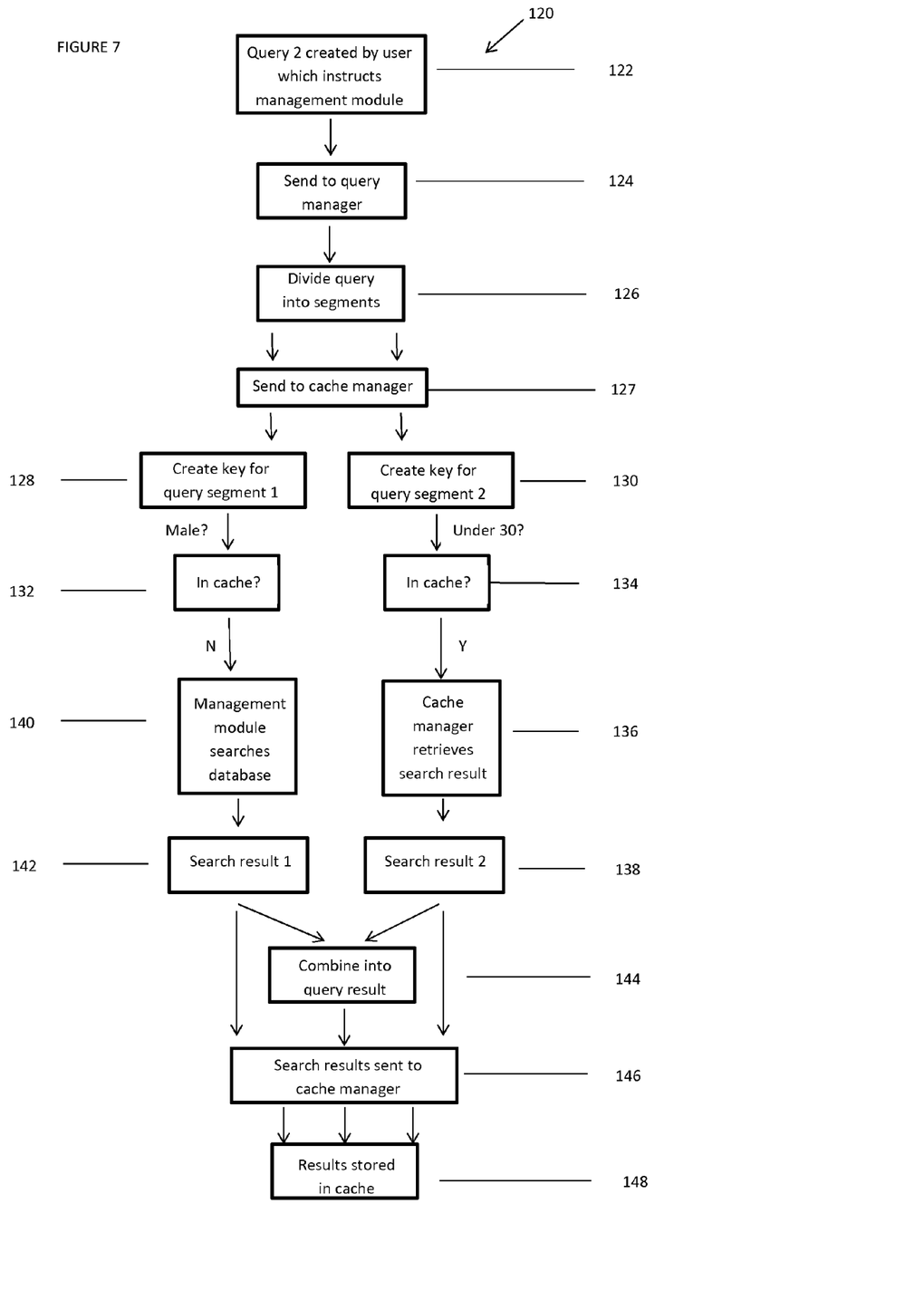
FIG. 7 is a flow diagram showing the second stage of the worked example of FIG. 6.

In order to aid understanding of the invention, there is now provided, with reference to FIGS. 6 and 7, a worked example:

In FIG. 6, a first example 90 for a method of updating the cache 18 from a user query 24 is shown. A user creates at Step 92 a first query 24 which instructs the management module 14 to identify all customers whose details are contained within the database 12 who are both female and under the age of 30. The management module 14 first sends at Step 94 the query 24 to the query manager 15, which breaks down at Step 96 the query 24 into query segments 30 and forwards them in Step 97 to the cache manager 18 to check whether a result for either query segment 30 is stored in the cache 16. To do this, the cache manger 16 creates at Steps 98 and 100 a cache key 40 for each segment. The cache manager 18 then searches at Steps 102 and 104 the cache 16 for each cache key 40. In this instance, it is the first time that the user has searched for either query segment 30, so neither of the query segments "customers under the age of 30" nor "customers who are female" are contained in the cache 16. When the cache manager 18 returns no results from its search, the management module 14 searches at Step 106 the database 12 for each query segment 30 individually; namely for 'customers who are female', and 'customers who are under the age of 30'. The individual search results 32 for those query segments 30 are returned at Steps 108 and 110, and then the two results are combined at Step 112 to produce an overall query result 26, which is returned to the user. At the same time, the results of the search are sent at Step 114 to the cache manager 18. The cache manager 18 then converts the results into cache entries 28 and adds at Step 116 them to the cache 16. In this case there are three cache entries 28; one for customers under the age of 30, one for customers who are female, and one for customers under the age of 30 and female.

Next, in FIG. 7, a second example 120 of a method of querying and updating the cache 18 from a user query 24 is shown. The user creates at Step 122 a second query 24; this time searching for 'customers who are male' and 'under the age of 30'. As with the first example 90, the management module 14 sends at Step 124 the query 24 to the query manager 15 which divides at Step 126 the query 24 into query segments 30. The query manager 15 then sends at Step 127 the query segments 30 to the cache manager 18, which creates at Steps 128 and 130 a cache key 40 for each query segment, and then searches at Steps 132 and 134 the cache 16 for each query segment 30. This time, a result for one of the query segments 30 is found and retrieved at Step 136; namely for 'customers under the age of 30'. This result is sent at Step 138 back to the management module 14, which then searches at Step 140 the database 12 for the remaining query segment 30 which was not present in the cache; namely for 'customers who are male'. Once a search result 32 for this query segment 30 is obtained at Step 142, the two search results 32 are combined at Step 144 as before to produce the overall query result 26. Finally, the new data is sent at Step 146 to the cache manager 18, and added at Step 148 to the cache 16, such that cache entries 28 for "customers who are male" and "customers who are male and under the age of 30" are created.

In another embodiment, queries 24 are handled by a component of the database system 10 known as CQueryManager (not shown), which works in parallel with the cache manager 18 to receive new queries 24 from a user via the UI 20, and to return query results 26 to the user, again through the UI 20.

It will be appreciated that the embodiments described herein are not to be considered limiting as the person skilled in the art could readily modify the embodiments to take different forms to that described here, without departing from the spirit and scope of the invention as defined in the appended claims.

The invention claimed is:

1. A database cache manager for controlling a data cache having a plurality of cache entries, each cache entry being a result of a query carried out on a database of data records, the cache manager being arranged to remove cache entries from the cache based on a cost of removal factor which comprises a time cost, the time cost being calculated from the amount of time taken to calculate a query result to which that cache entry is related.

2. A database cache manager of claim 1, wherein the cache manager is further arranged to calculate the time cost.

3. A database cache manager of claim 1, wherein the cost of removal factor is comprised of a frequency cost which is calculated from the frequency with which the cache entry has been used in the past.

4. A database cache manager of claim 3, wherein the cache manager is further arranged to calculate the frequency cost.

5. A database cache manager of claim 1, wherein the cost of removal factor is comprised of a recency cost which is calculated from an elapsed time since the cache entry was last used.

6. A database cache manager of claim 5, wherein the cache manager is further arranged to calculate the recency cost.

7. A database cache manager of claim 1, wherein the cost of removal factor is comprised of a frequency cost which is calculated from the frequency with which the cache entry has been used in the past and a recency cost which is calculated from an elapsed time since the cache entry was last used.

8. A database cache manager of claim 7, wherein the cache manager is further arranged to calculate the time cost, the frequency cost and the recency cost.

9. A database cache manger of claim 8, wherein the cost of removal factor equals $(0.3 \times \text{recency cost}) + (0.3 \times \text{frequency cost}) + (0.4 \times \text{time cost})$.

10. A database cache manager of claim 9, wherein the cost of removal factor is comprised of the time cost and maximizing the number of cache entries retained within the cache.

11. A database cache manager of claim 1, wherein the cache manager is further arranged to store the cost of removal factor with each cache entry in the data cache.

12. A database cache manager of claim 1, wherein the cache manager is arranged to create and store a definition file with each cache entry, the definition file which describes the cache entry and assists in the searching of that cache entry.

13. A database cache manager of claim 1, wherein the cache manager is arranged to assign a key to each cache entry, wherein the key is a unique identifier of the entry and comprises information which contributes to the query result with which the cache entry is associated.

14. A database cache manager of claim 13, further comprising a hashing module arranged to create hash keys of the keys stored in the cache entries, which enables efficient searching of data stored in the cache by the cache manager.

15. A database cache manager of claim 14, wherein the hashing module is arranged to create hash keys and to populate a hash map with the created hash keys.

16. A database cache manager of claim 15, wherein the cache manager is arranged to use the hash keys to search the cache for the results to a query.

17. A database cache manager of claim 1, wherein at least one of the cache entries stored in the cache comprise a result of an individual query segment.

18. A database cache manager of claim 17, further arranged to combine different stored cache entries representing individual query segments to return a complete multi-segment query result.

19. A database cache manager of claim 1, wherein at least one of the cache entries stored in the cache comprise a result of a complete multi-segment query.

20. A database cache manager of claim 1, further comprising a class module for referencing a class of cache results, wherein manipulation of the class enables management of all cache entries belonging to that class.

21. A database cache manager of claim 1, wherein the cache manager is arranged to store properties and methods relating to manipulation of the cache entry with the cache entry itself.

22. A database cache manager of claim 21, wherein the cache manager is arranged to store the size of the cache entry, the time taken to create the cache entry and methods of manipulation applicable to the cache entry.

23. A method of controlling a data cache having a plurality of cache entries, each cache entry being a result of a query carried out on a database of data records, the method comprising:
    calculating a time cost from the amount of time taken to calculate a query result to which a corresponding cache entry is related; and
    removing a cache entry from the data cache based on a cost of removal factor which comprises the time cost.

24. A database system comprising:
    a database of a first plurality of data records;
    a data cache storing a second plurality of cache entries less than the first plurality, each entry being a result of a query carried out on the database and which can be accessed more quickly than by querying the database;
    a cache manager for controlling the cache, the cache manager being arranged to remove cache entries from the cache based on a cost of removal factor which is comprised of comprises a time cost, the time cost being calculated from the amount of time taken to calculate the query result that the cache entry relates to.

* * * * *